United States Patent [19]

Roe et al.

[11] E Re. 29,747

[45] Reissued Aug. 29, 1978

[54] LIQUID RING PUMP LOBE PURGE

[75] Inventors: Kenneth W. Roe, Winfield, Ill.; Ernest E. Studwell, East Norwalk; Robert E. Cooke, West Redding, both of Conn.

[73] Assignee: Nash Engineering Company, Norwalk, Conn.

[21] Appl. No.: 779,387

[22] Filed: Mar. 21, 1977

Related U.S. Patent Documents

Reissue of:

[64] Patent No.: 3,846,046
Issued: Nov. 5, 1974
Appl. No.: 321,602
Filed: Jan. 8, 1973

U.S. Applications:

[63] Continuation of Ser. No. 120,421, Mar. 3, 1971, abandoned.

[51] Int. Cl.[2] ..... F04C 19/00

[52] U.S. Cl. ..... 417/54; 417/68

[58] Field of Search ..... 417/68, 69, 54, 55, 417/53

[56] References Cited

U.S. PATENT DOCUMENTS 3,209,987 10/1965 Jennings ..... 417/68

FOREIGN PATENT DOCUMENTS 823,170 12/1951 Fed. Rep. of Germany ..... 417/68
1,528,760 2/1971 Fed. Rep. of Germany ..... 417/68

*Primary Examiner*—Carlton R. Croyl
*Assistant Examiner*—R. E. Gluck
*Attorney, Agent, or Firm*—Nolte & Nolte

[57] ABSTRACT

Purging passages are machined or cast into the casing of a liquid ring compressor through which soluble or non-soluble contaminants which may be present in the liquid ring may be removed from the compressor. These passages in single lobe pumps are located in the outer peripheral zones of the casing approximately 240° from the pump land in the direction of rotation of the rotor in the area of the drive and idle ends of the rotor.

8 Claims, 8 Drawing Figures

LIQUID RING PUMP LOBE PURGE

Matter enclosed in heavy brackets [ ] appears in the original patent but forms no part of this reissue specification; matter printed in italics indicates the additions made by reissue.

This is a continuation of application Ser. No. 120,421 filed Mar. 3, 1971, now abandoned.

This invention relates to liquid ring pumps and more particularly to a structure for and method of purging liquid or solid contaminants from the pumping fluid of a fluid ring vacuum pump or compressor.

Excessive wear or corrosion of the pump or compressor parts can result if contaminants are retained in the liquid ring. Solid contaminants, such as silt, perlite, sand or the like, as well as liquid contaminants, may enter the pump entrained in the gas stream or in the sealing liquid or they may be formed as a result of a chemical reaction within the pump. When extremely corrosive contaminants are present in the pumping fluid or liquid ring, pump life can be reduced to an unacceptable level.

As the trend toward conserving fresh water continues and the use of process water as a pump sealant becomes more commonplace, the level of contaminants being introduced into the liquid ring will increase. With this increase it becomes increasingly necessary to remove such contaminants to prolong pump life.

The purging or draining of contaminants from the pump through conventional locations such as unloader slots has been found to be ineffective.

It was found that while gas and seal liquid are continuously cycled through the pump by the nature of the pumping action of the liquid ring, heavy (high density) contaminants have a tendency to migrate to and remain at a given location within the pump and are accordingly not discharged with the seal liquid and discharged gases. These concentrations of contaminants cause the undue wear and premature failure of the pump. The locations of the wear and hence of the concentration, of contaminants can be determined by the obvious expedient of dismantling the pump and inspecting it.

Accordingly it is an object of the present invention to purge undesirable liquid or solid contaminants from the pumping fluid of a liquid ring pump or compressor.

According to the present invention contaminant purging passages are located in a liquid ring pump at or near the intersection of the end wall and the outer wall of the casing preferably at approximately 240° from the land in the direction of rotation of the rotor in the discharge zone of the pumping cycle. Entrained contaminants such as sand or other granular material as well as heavy (high density) contaminating liquids will be effectively removed when a controlled amount of the pumping liquid is removed from the liquid ring through these purging passages.

This purging can be achieved externally by the use of tubing which extends from the pump body or internally through machined and/or cast passages in the pump body itself. The amount of liquid purged can be regulated by means of an orifice or by judicious selection of the pipe size. The purge can be dumped into an external drain or into the discharge of the pump and from there into a system drain.

These and further objects, features and advantages of the present invention will become apparent from the following description of the specific embodiments of the invention taken in conjunction with the accompanying drawings which form an integral part hereof and in which.

Figure 1:
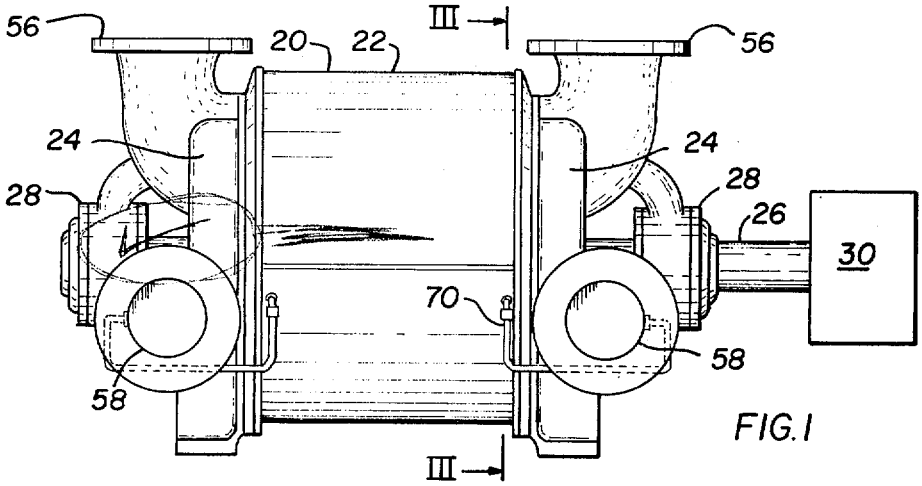
FIG. 1, is an elevational view of a liquid ring pump made in accordance with the teachings of the present invention.
Figure 2:
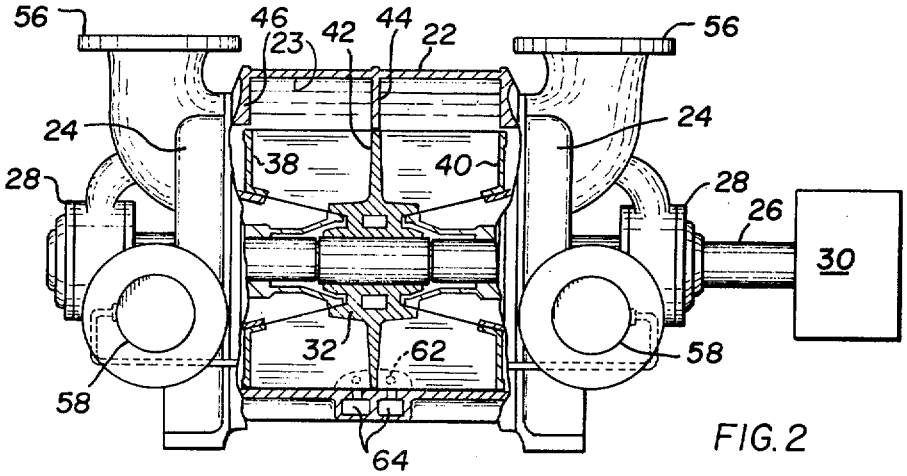
FIG. 2, is a partial showing of the liquid ring pump illustrated in FIG. 1 broken away to show the interior of the pump housing.
Figure 3:
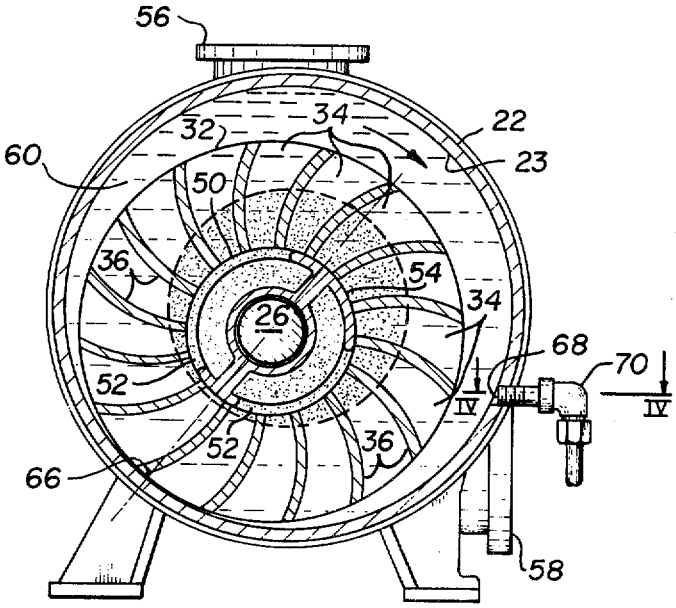
FIG. 3, is a view of the liquid ring pump illustrated in FIG. 1 taken along lines III—III thereof.

A circular lobe liquid ring compressor 20 is illustrated in FIGS. 1–3. The compressor includes a single lobe casing or body 22 which has a cylindrical interior surface 23 and which at its ends is closed by a pair of pump heads 24. A main drive shaft 26 is rotationally supported by a pair of bearings seated in bearing housings 28 and is driven by a motor 30 or other suitable motive force diagrammatically illustrated.

A rotor 32 of the duplex variety containing a plurality of pumping chambers 34 defined by radially extending blades or vanes 36 which are fixedly mounted between the idle end shroud 38 and drive end shroud 40 and central partition 42 is suitably keyed to the drive shaft 26 for rotation therewith. The central partition 42 and the idle end shroud 38 and drive end shroud 40 which are located adjacent to the pump heads are in line respectively with casing partition 44 and casing side wall portions 46 of the pump casing 22.

The base of each pumping chamber 34 is ported, as at 50, for co-operation with ports 52 in the cone or port members 54. The ports of the cone members communicate with the inlet passages 56 and the outer passages 58 of the pump heads 24.

As can be seen from FIG. 2, conventional apertures 62 may be present connecting the interior of the casing 22 to unloader passageways 64 to provide an unloading or drain connection to the pump by virture of valves and piping not shown. These unloader apertures 62 are located at the bottommost portion of the casing 22 (approximately 330° from the pump land 66 in the direction of rotation of the impeller) and in the vicinity of the central partition 42 of the rotor.

Figure 4:
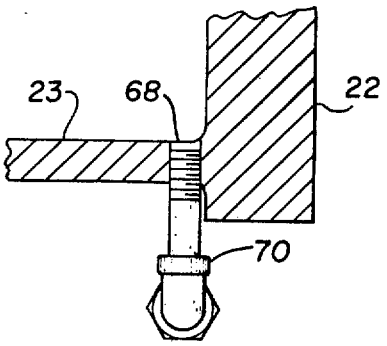
FIG. 4 is a view of the liquid ring pump illustrated in FIG. 3 taken along lines IV—IV thereof.

A conduit 70, which may be piping, threadedly engaged to the casing as illustrated in FIGS. 3 and 4, communicates with the outlet passages 58 whereby the contaminants will be purged into the discharge flow. The amount of liquid purged can be regulated by a judicious selection of the pipe size or by the utilization of an orifice or other flow limiting device.

Figure 5:
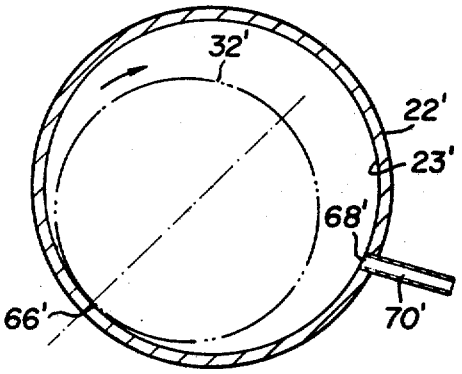
FIG. 5 is a view similar to that of FIG. 3 illustrating a second preferred embodiment.

In the second preferred embodiment illustrated in FIG. 5, hole 68' and conduit 70' are arranged for radial purge from casing 22'. Two holes are drilled through the interior cylindrical surface 23' in the vicinity of the drive end shroud and idle end shroud. At the drive end (FIG. 5) a first hole 68' extends radially through the casing at a location approximately 240° from the land 66' of the compressor in the direction of rotation of the impeller 32'.

Figure 6:
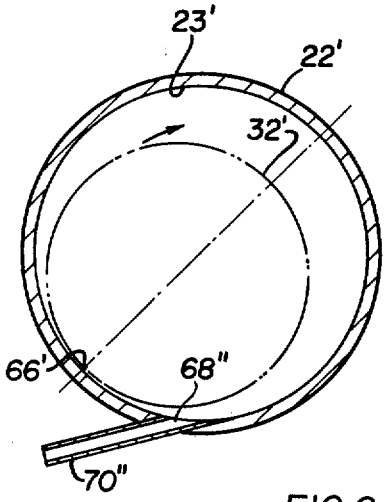
FIG. 6 is a similar view to that of FIG. 3 showing a third preferred embodiment.

In the third preferred embodiment illustrated in FIG. 6, hole 68' and conduit 70' are arranged for tangential purge from the casing 22'.

Holes and conduits are located in the casing close to both the drive end shroud and the idle end shroud of the rotor in a manner similar to the arrangement of the second preferred embodiment.

The tangential purge location at the idle end of the pump was partially effective with no liquid flow. Best results were obtained, however, with a liquid flow.

While in the first embodiment the purging conduits were threadedly engaged to the pump casing and purging conduits in the second preferred embodiment are plain tubing which are connected to the casing by use of Hysol, Devcon or other like cement.

Figure 7:
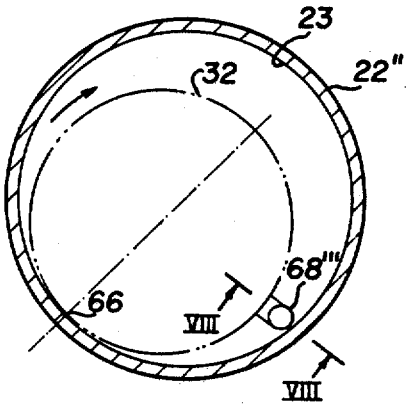
FIG. 7 is a view similar to that of FIG. 3 illustrating a fourth preferred embodiment of the present invention.
Figure 8:
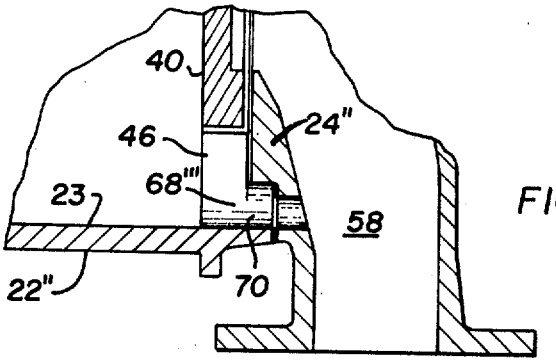
FIG. 8 is a view of the fourth preferred embodiment taken along lines VIII—VIII of FIG. 7.

In the fourth preferred embodiment illustrated in FIGS. 7 and 8 a purge passage 68''' is machined through casing 22''' to purge the chamber between head 24''' and the rotor and through the casing side walls 46''' to purge the casing. This purge passage 68''' is located to communicate with the discharge passage 58'''.

While the purge can be effective, with proper flow, through a large angular range, which could be defined as the gas discharge zone of the pump, optimum effectiveness is achieved when the purge holes are located approximately 240° from the land in the direction of rotation of the rotor.

The purged fluid can be discharged into a drain or into the discharge of the pump as is done in the preferred embodiments. If a recirculated seal system is used the contaminants must be discharged separately and not returned with the seal liquid.

What is claimed is:

1. A method of reducing wear in liquid ring pumps which would result from abrasive action of contaminants carried in the liquid of the ring which method comprises, *determining the region where excessive wear would occur as a result of contaminants carried by the liquid ring*, forming conduit means opening to the interior of the ring chamber at [a] *said* region [where, but for that opening, excessive wear would occur] and during operation of the pump, purging a portion of the ring liquid and a substantial part of the contaminants of the ring through said conduit means.

2. A method of constructing a liquid ring pump which consists in determining where excessive wear results from contaminants carried by the liquid ring and forming conduit means opening to the ring at that location whereby in operation a portion of the ring liquid and a major part of the contaminants is purged from the interior of the pump through said conduit means.

3. A method of constructing a liquid ring pump of the type having a casing, a rotor disposed within the casing and having end shrouds between which extend a plurality of generally radial vanes which, with the shrouds, define displacement chambers, radially inner and outer ends of which are open, inner edges of the vanes defining a central eye, a fixed conical port member extending into the eye and having inlet and outlet ports with which the inner ends of the displacement chambers alternatively are brought into register as the rotor turns which method comprises determining where in such a pump excessive wear results from contaminants carried by the liquid ring and forming conduit means opening to the ring at that location whereby in operation a portion of the ring liquid and a major part of the contaminants is purged from the interior of the pump.

4. A method of constructing a liquid ring pump as claimed in claim 3 which comprises disposing said conduit means to communicate with the ring adjacent an end shroud of the rotor.

5. A method of constructing a liquid ring pump as claimed in claim 3 in which the liquid ring pump includes a head adjacent one of said shrouds said head defining with said one shroud an end shroud chamber, the method consisting of disposing said conduit means to communicate with said end shroud chamber.

6. The method of constructing a liquid ring pump as claimed in claim 3 which comprises disposing said conduit means to communiate with the ring at approximately 240° from land in the direction of rotation of the rotor.

7. The method according to claim 4 wherein said opening is formed by machining through an existing wall of said pump.

8. The method of constructing a liquid ring pump as claimed in claim 5 which comprises disposing said conduit means to communicate with the end shroud chamber at approximately 240° from land in the direction of rotation of the rotor.

* * * * *